Patented Mar. 10, 1953

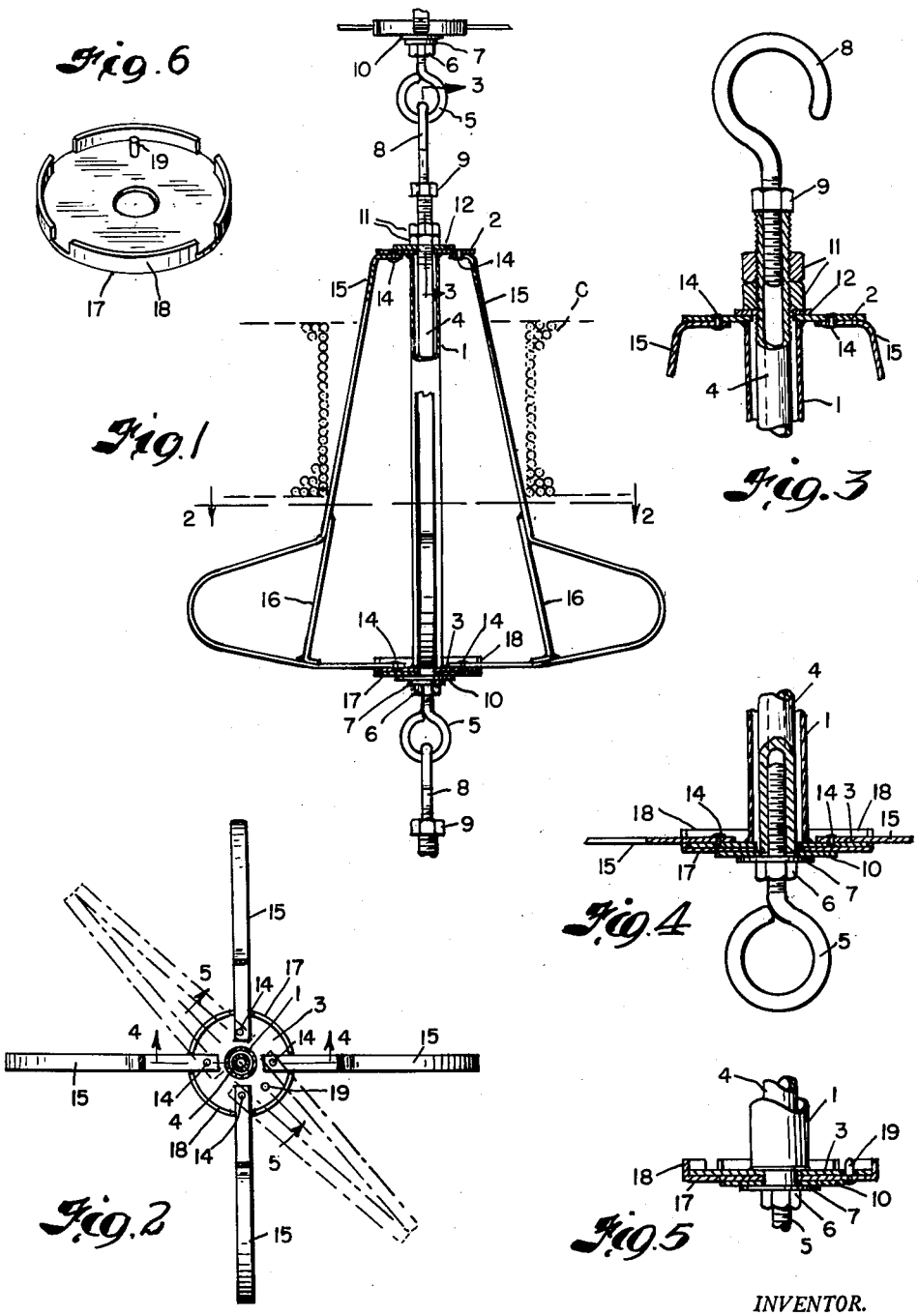

2,630,980

UNITED STATES PATENT OFFICE 2,630,980

COLLAPSIBLE SUPPORT FOR COILS

Archie B. Weaver, Lorain, Ohio

Application June 12, 1951, Serial No. 231,203

3 Claims. (Cl. 242—129)

The present invention relates generally as indicated to a collapsible support for coils and more particularly to a support for wire coils and the like to facilitate unwinding of the wire without kinking for drawing through electrical conduits.

One object of the present invention is to provide a support device for coils which is not only collapsible to a compact form, but in addition, is economical to manufacture, fool-proof in operation, and of great strength while of light weight to enable supporting of heavy coils thereon and also supporting of a plurality of similar devices therefrom.

Another object of this invention is to provide a device of the character indicated which has novel means for locking the same in operative coil-supporting position and for unlocking whereby the device may be collapsed or folded to a generally flat form occupying a small space for convenient storage and for transportation from one place to another.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is a side elevation view partly in cross-section showing one embodiment of the invention in coil-supporting position suspended from a similar device thereabove and supporting a still further device therebelow;

Fig. 2 is a horizontal section view taken substantially along the line 2—2, Fig. 1;

Fig. 3 is a fragmentary vertical cross-section view along line 3—3, Fig. 1, on an enlarged scale of the upper portion of the device illustrated in Fig. 1;

Fig. 4 is a fragmentary vertical cross-section view along line 4—4, Fig. 2, of the lower portion of the device illustrated in Fig. 1;

Fig. 5 is a fragmentary vertical cross-section view along the line 5—5, Fig. 2, also of the lower portion of the device; and Fig. 6 is a perspective view of the lock plate for releasably locking the device in operative position.

Referring now in detail to the drawing, the device as illustrated therein comprises a tubular hub member 1 having flanges 2 and 3 welded or otherwise secured thereto at the opposite ends. Extending through said hub member 1 is a spindle 4 also preferably of tubular form having an eye bolt 5 threaded into its lower end locked in place as by means of the lock nut 6 clamping a washer 7 against the lower end of said spindle and having a hook 8 threaded into its upper end locked in place as by means of the lock nut 9. Resting upon the washer 7 is a thrust washer 10 serving as a thrust bearing.

The upper end of said spindle 4 is externally threaded with a pair of nuts 11 threaded thereonto for adjustably pressing the washer 12 against the upper end of the tubular hub member 1. Accordingly, the washers 10 and 12 on said spindle 4 provide relatively vertically movable shoulders between which the tubular hub member 1 is adapted to be clamped with desired pressure to control the friction and thus the force which must be exerted in order to rotate said tubular hub member 1 on said spindle 4.

Pivotally secured as by means of rivets 14 to the flanges 2 and 3 at uniformly spaced points therearound are a plurality of radiating arms 15 having outwardly extending top and bottom portions and downwardly and outwardly sloping side portions, of which the lower portions are bent abruptly outwardly and thence inwardly to provide supporting legs for the bottoms of the coils adapted to be placed over said arms 15.

As evident, the downwardly and outwardly sloping side portions of the arms 15 make it possible to support different sizes of coils thereon. As best shown in Fig. 2, the arms 15 radiate outwardly from the hub member 1 and are adapted to be swung to the positions shown in dotted lines wherein the arms are generally parallel to each other, and in which position of the arms the device as a whole occupies a very small space for convenient storage and transportation.

In order to permit the use of relatively light weight strip stock for said arms 15, braces 16 are welded or otherwise secured thereto as shown, to prevent both downward and inward collapse of the lower side portions of the arms by heavy coils resting thereon.

In order to releasably lock the arms 15 in the operative position, a lock plate 17 is provided between the washer 10 and the bottom flange 3 of the hub member 1, said lock plate, as best shown in Fig. 6, having an upstanding rim 18 notched at circumferentially spaced points to receive therein the bottom portions of the respective arms 15, said lock plate being held against rotation with respect to the hub member 1 as by means of the pin 19 projecting upwardly therefrom through an opening in the bottom flange. When it is desired to disengage said arms 15 from said lock plate 17 for collapsing the device, the nuts 11 at the top of spindle 4 are loosened whereby the entire hub and arm assembly may be raised with respect to the lock plate. When said arms 15 are thus disengaged, the same may be swung to the dotted line positions of Fig. 2 and if desired the nuts 11 may be screwed down to hold the arms in folded position.

In using the device, the same is first opened so that the arms 15 radiate therefrom. Next, the nuts 11 are adjusted to provide the desired friction between washers 10 and 12 and the ends of the hub 1. A coil of wire C or the like is then slipped over the arms 15, such coil being centered by wedging action with the side portions of the arms or resting on the outwardly bent lower side portions. The device may then be hung by means of hook 8 from a joist, I-beam or like overhead support and a series of uncollapsed devices each with a coil thereon may be suspended one from the other by hooks 8 hooked in eye bolts 5 with the spindles 4 arranged in end-to-end relation.

Thus, the wires from the several coils may be simultaneously pulled off without kinking at desired rates of speed, it being noted that the hub and arm assemblies of the devices when thus hung are rotatable independently of each other whereby the coil diameters need not be the same size on each support. Moreover, because the friction between the respective hubs and spindles has been desirably adjusted, the wires may be jerked or suddenly stopped without causing overrunning or back-lash.

A further important feature of the present invention is that each coil support unit consisting of the hub 1 and the arms 15 supports only the weight of the coil thereon while the cumulative weights of the coils (and the devices) therebelow are supported by the spindles 4, the top spindle supporting the entire weight of the several coils and the second spindle supporting the weight of the remaining coils except that of the top coil, etc. Thus, each individual coil support need only be made strong enough to support the heaviest coil placed thereon, the load of several devices and coils being a directly downward load best carried by a straight, vertically disposed tension member such as the spindle 4. Moreover, the number of support devices connected together has no noticeable effect on the turning force which must be exerted on any one of the coils to unwind the coiled material therefrom.

Other modes of applying the principle of the invention may be employed, change being made as regards the details described, provided the features stated in any of the following claims, or the equivalent of such, be employed.

I therefore particularly point out and distinctly claim as my invention:

1. In combination, a vertically disposed spindle provided with vertically spaced, relatively vertically adjustable shoulders, a coil support journalled on said spindle, said support comprising a tubular hub, flanged at opposite ends, and disposed between the shoulders of said spindle, a plurality of radiating arms including outwardly extending top and bottom portions respectively pivotally secured at circumferentially spaced points to such flanges and downwardly and outwardly extending side portions adapted to extend into and to support a coil thereon, a lock plate non-rotatably engaged with said hub and formed with circumferentially spaced notches for receiving the bottom portions of said arms therein whereby said arms are held against swinging movement on said hub, said support and spindle, upon relative movement of the shoulders of said spindle, being relatively movable vertically to disengage said arms from said lock plate whereby said arms may be swung to collapsed position whereat said arms are disposed in generally parallel relation to one another.

2. In combination, a vertically disposed spindle provided with vertically spaced, relatively vertically adjustable shoulders, a coil support journalled on said spindle, said support comprising a tubular hub, flanged at its opposite ends, and disposed between the shoulders of said spindle, a plurality of radiating arms including outwardly extending top and bottom portions respectively pivotally secured at circumferentially spaced points to said flanges and downwardly and outwardly extending side portions adapted to extend into and to support a coil thereon, a lock plate disposed between one of the shoulders of said spindle and the adjacent flanged end of said hub and formed with circumferentially spaced notches for receiving the outwardly extending portions of said arms which are pivotally secured to such adjacent flanged end of said hub whereby said arms are held against swinging movement on said hub, said support and spindle, upon relative movement of the shoulders of said spindle, being relatively movable vertically to disengage said arms from said lock plate whereby said arms may be swung to collapsed position whereat said arms are disposed in generally parallel relation to one another.

3. The combination of claim 2 wherein one of said shoulders includes nut means threaded onto said spindle and operative to move the shoulders of said spindle into frictional engagement with one of the flanged ends of said hub and with said lock plate for varying the force which must be applied on said support to rotate the same relative to said spindle.

ARCHIE B. WEAVER.

REFERENCES CITED

The following references are of record in the file of this patent:

UNITED STATES PATENTS

| Number | Name | Date |
|---|---|---|
| 987,411 | Spencer | Mar. 21, 1911 |
| 1,031,155 | Williams | July 2, 1912 |
| 1,929,469 | Ball | Oct. 10, 1933 |
| 2,150,477 | Wright | Mar. 14, 1939 |
| 2,170,764 | Penman | Aug. 22, 1939 |
| 2,463,192 | Mackey et al. | Mar. 1, 1949 |